United States Patent
Miyamoto

(10) Patent No.: US 9,451,102 B2
(45) Date of Patent: Sep. 20, 2016

(54) IMAGE PROCESSING SYSTEM AND IMAGE PROCESSING METHOD

(71) Applicant: KYOCERA Document Solutions Inc., Osaka-shi (JP)

(72) Inventor: Kazuhiko Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/806,341

(22) Filed: Jul. 22, 2015

(65) Prior Publication Data

US 2016/0037000 A1 Feb. 4, 2016

(30) Foreign Application Priority Data

Jul. 30, 2014 (JP) ................. 2014-154687

(51) Int. Cl.
*H04N 1/00* (2006.01)
*H04N 1/32* (2006.01)

(52) U.S. Cl.
CPC ...... *H04N 1/00206* (2013.01); *H04N 1/00079* (2013.01); *H04N 1/00244* (2013.01); *H04N 1/00384* (2013.01); *H04N 1/00408* (2013.01); *H04N 1/00472* (2013.01); *H04N 1/32085* (2013.01); *H04N 1/32101* (2013.01); *H04N 2201/0094* (2013.01)

(58) Field of Classification Search
CPC ...... H04N 1/00206; H04N 1/00408; H04N 1/00384; H04N 1/00244; H04N 1/32101; H04N 1/00079; H04N 1/00472; H04N 1/32085; H04N 2201/00094
USPC ....................................... 358/1.15
See application file for complete search history.

(56) References Cited

U.S. PATENT DOCUMENTS

| 8,970,878 | B2 * | 3/2015 | Kakegawa | G06F 3/1208 358/1.15 |
| 9,141,313 | B2 * | 9/2015 | Yamaguchi | G06F 3/1204 |
| 2010/0079818 | A1 * | 4/2010 | Seo | G06K 15/02 358/3.24 |
| 2010/0088606 | A1 * | 4/2010 | Kanno | G06T 11/203 715/733 |
| 2013/0246509 | A1 * | 9/2013 | Sakiyama | G06F 3/1203 709/203 |
| 2014/0074911 | A1 * | 3/2014 | Park | H04L 65/602 709/203 |

FOREIGN PATENT DOCUMENTS

| JP | 2006-079140 A | 3/2006 |
| JP | 2012-182598 A | 9/2012 |

* cited by examiner

*Primary Examiner* — Allen H Nguyen
(74) *Attorney, Agent, or Firm* — Studebaker & Brackett PC

(57) ABSTRACT

Upon an image processing device receiving a message from a terminal device, a screen display section displays the message and a predetermined inquiry key in a predetermined screen image on the image processing device. The message is displayed using a font preregistered in the image processing device. Upon the image processing device receiving input of selecting the inquiry key, a screen image transmitting section transmits to the server the screen image in which the message is displayed and information specifying the terminal device as a transmission source of the message. Upon the server receiving the screen image, a screen image notifying section notifies the screen image to the terminal device based on the information specifying the terminal device as the transmission source of the message. Upon the server receiving a re-created message from the terminal device, a re-notification section notifies the re-created message to the image processing device.

6 Claims, 7 Drawing Sheets

IMAGE PROCESSING SYSTEM AND IMAGE PROCESSING METHOD

INCORPORATION BY REFERENCE

The present application claims priority under 35 U.S.C. §119 to Japanese Patent Application No. 2014-154687 filed Jul. 30, 2014. The contents of this application are incorporated herein by reference in their entirety.

BACKGROUND

The present disclosure relates an image processing system and an image processing method.

Various schemes are currently available for converting text strings on image processing devices, such as copiers and multifunction peripherals, and terminal devices, such as personal computers. In an example of a typically known communication system, a communication device and an information processing device are communicatively connected to each other. The information processing device receives text data from the communication device. If the font specified for the text data is not available in the information processing device, the information processing device displays text represented by the text data using an alternative font. This enables the information processing device to support many different languages. Some known mobile terminals can create a text font based on handwritten text and transmit an image of text displayed in the text font via e-mail. That is, the mobile terminal can transmit an image of text displayed in the font resembling the specific handwriting.

SUMMARY

An image processing system according to an aspect of the present disclosure includes a terminal device, a server, and an image processing device. The image processing device includes a screen display section and a screen image transmitting section. The server includes a screen image notifying section and a screen image notifying section. Upon the image processing device receiving a message from the terminal device, the screen display section displays the message and a predetermined inquiry key in a predetermined screen image on the image processing device, the message being displayed using a font registered in advance in the image processing device. Upon the image processing device receiving input of selecting the inquiry key, the screen image transmitting section transmits to the server the screen image in which the message is displayed and information specifying the terminal device as a transmission source of the message. Upon the server receiving the screen image, the screen image notifying section notifies the screen image for re-creation of the message to the terminal device based on the information specifying the terminal device as the transmission source of the message. Upon the server receiving the re-created message from the terminal device, the screen image notifying section notifies a re-created message to the image processing device.

An image processing method according to another aspect of the present disclosure is for use in an image processing system including a terminal device, a server, and an image processing device. The image processing method includes: upon receiving a message from the terminal device, the image processing device displaying the message and a predetermined inquiry key in a predetermined screen image on the image processing device, the message being displayed using a font registered in advance in the image processing device; upon receiving input of selecting the inquiry key, the image processing device transmitting to a server a screen image in which the message is displayed using the registered font and information specifying the terminal device as a transmission source of the message; upon receiving the screen image, the server notifying the screen image for re-creation of the message to the terminal device based on the information specifying the terminal device as the transmission source of the message; and upon receiving a re-created message from the terminal device, the server notifying the re-created message to the image processing device.

DETAILED DESCRIPTION

With reference to the accompanying drawings, a description is given of an embodiment of an image processing system and an image processing method according to the present disclosure in order to facilitate clear understanding of the present disclosure. The embodiment below is only a specific example of the present disclosure and not intended to limit the technical scope of the present disclosure. In the flowchart, a numeral preceded by the letter S indicates a step.

The following now describes an image processing system that includes two different terminal devices and an image processing system as the embodiment of the present disclosure. The image processing device according to the present disclosure is a multifunction peripheral (MFP) combining the functions of, for example, a facsimile machine, a copier, a scanner, and a printer.

Figure 1:
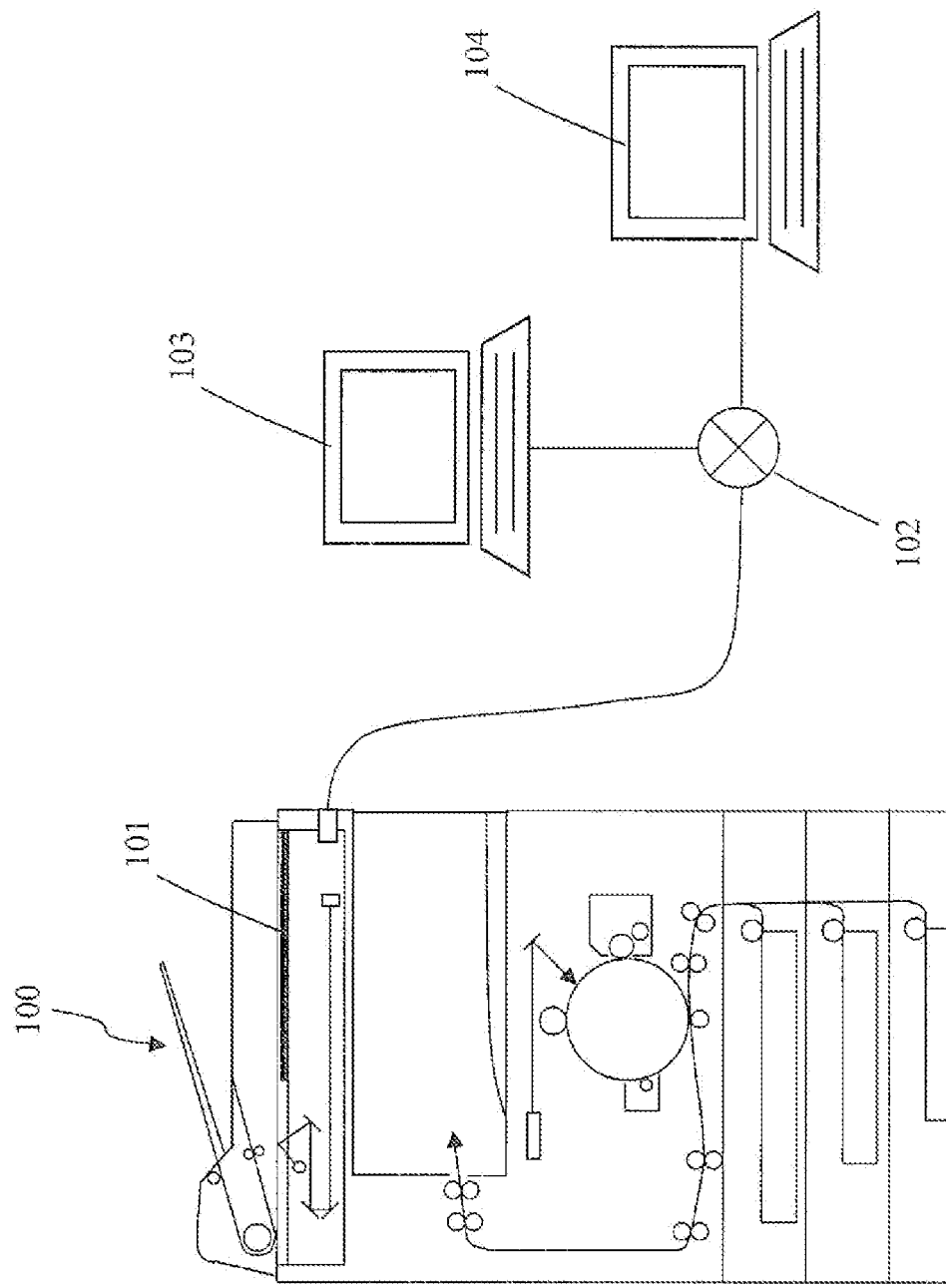
FIG. 1 is a conceptual diagram showing the overall configuration of an image processing system according to the present disclosure.

As shown in FIG. 1, a multifunction peripheral 100 includes an operation section 101 provided with a touch panel. When a user inputs settings of a print job on the touch panel, the multifunction peripheral 100 drives relevant components such as an image reading section, an image processing section, a conveyance section, and a fixing section to perform the requested print job.

The multifunction peripheral 100 includes a communication section and is communicatively connected to a network 102 via the communication section. The network 102 is connected to a terminal device 103 and a server 104 to enable communications therebetween. That is to say, the multifunction peripheral 100, the terminal device 103, and the server 104 together form an image processing system. The image processing system may include a plurality of multifunction peripherals 100 in addition to the terminal device 103 and the server 104. In that case, the terminal device 103 functions as a management terminal device that for example creates a message such as a document and transmits the message to the plurality of multifunction peripherals 100.

Although not shown in the figures, the multifunction peripheral 100, the terminal device 103, and the server 104 each include a control circuit which in turn includes a central processing unit (CPU), a read only memory (ROM), a random access memory (RAM), a hard disk drive (HDD), and drivers that are interconnected via an internal bus.

The drivers in each of the multifunction peripheral 100, the terminal device 103, and the server 104 are for driving the corresponding driving sections. In each of the multifunction peripheral 100, the terminal device 103, and the server 104, the corresponding CPU uses, for example, the RAM as a work area for executing programs stored in the ROM or HDD. According to execution results, the CPU of the multifunction peripheral 100, the terminal device 103, or the server 104 transmits and receives data, instructions, signals and/or directives to and from the corresponding drivers, thereby controlling the driving sections relevant to processing being performed. The components (shown in FIG. 2) of the multifunction peripheral 100, the terminal device 103, and the server 104 other than the driving sections are also implemented through program execution by the respective CPUs. The multifunction peripheral 100, the terminal device 103, the server 104 each store, in its ROM, RAM, or HDD, programs and data for implementing the components described below.

With reference to FIGS. 1 to 4B, a description is given of the configuration and the execution procedure according to the embodiment of the present disclosure. First, a user (administrator, for example) creates on the terminal device 103 a message 400, which is directed to the multifunction peripheral 100 connected to the network 102. The message 400 may provide information for a user of the multifunction peripheral 100 being the transmission destination of the message 400 or information about the date and time of upcoming automatic update of software (firmware, for example) installed in the multifunction peripheral 100. Where a plurality of multifunction peripherals 100 are connected to the network 102, the administrator can simultaneously transmit (broadcast) such a message 400 to all of the multifunction peripherals 100 connected to the network 102. Text constituting the contents (document) of the message 400 includes a text code and a specification of the font to be used for displaying the text represented by the text code.

Figure 2:
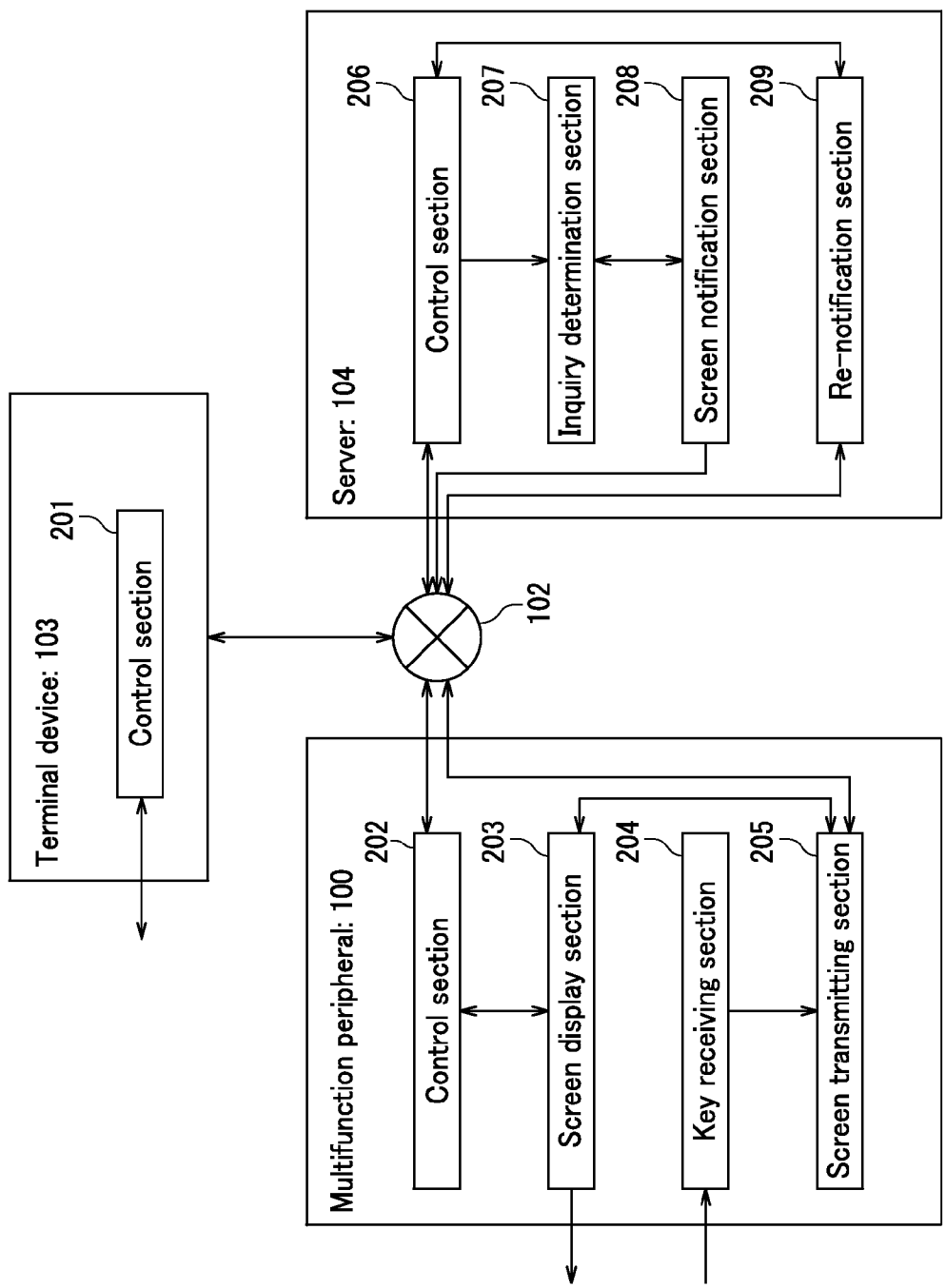
FIG. 2 shows functional blocks of an image processing system according to an embodiment of the present disclosure.

Once completing creation of a message 400 on the terminal device 103, the user being the sender of the message 400 inputs a predetermined transmission instruction to the terminal device 103. In response to the transmission instruction, a control section 201 of the terminal device 103 transmits the message 400 to the multifunction peripheral 100 via the network 102 (S101 in FIG. 3), as shown in FIGS. 2 and 4A.

Consequently, a control section 202 of the multifunction peripheral 100 receives the message 400 (text code and the font specification) from the terminal device 103 (S102 in FIG. 3) and notifies a screen display section 203 of the multifunction peripheral 100 that the message 400 is received. Upon receipt of the notification, the screen display section 203 displays, on the operation section 101, a predetermined screen image 401 in which the message 400 is displayed using a font that is preregistered in for example the operation section 101 and a predetermined inquiry key 402 (S103 in FIG. 3).

The scheme employed by the screen display section 203 to display the screen image 401 including the message 400 and the inquiry key 402 is not specifically limited. In one example, the operation section 101 may include a plurality of fonts registered in advance, the plurality of fonts corresponding to the languages common in the intended shipment destination of the multifunction peripheral 100. From among the plurality of registered fonts, the screen display section 203 selects a registered font corresponding to the font specified in the message 400. The screen display section 203 converts the text code of the message 400 into text in the thus selected registered font and displays text resulting from the conversion in a pop-up window appearing at a specific position in the screen image 401. This allows the user of the multifunction peripheral 100 being the transmission destination of the message 400 to directly view the message 400 transmitted from the user being the sender.

Figure 3:
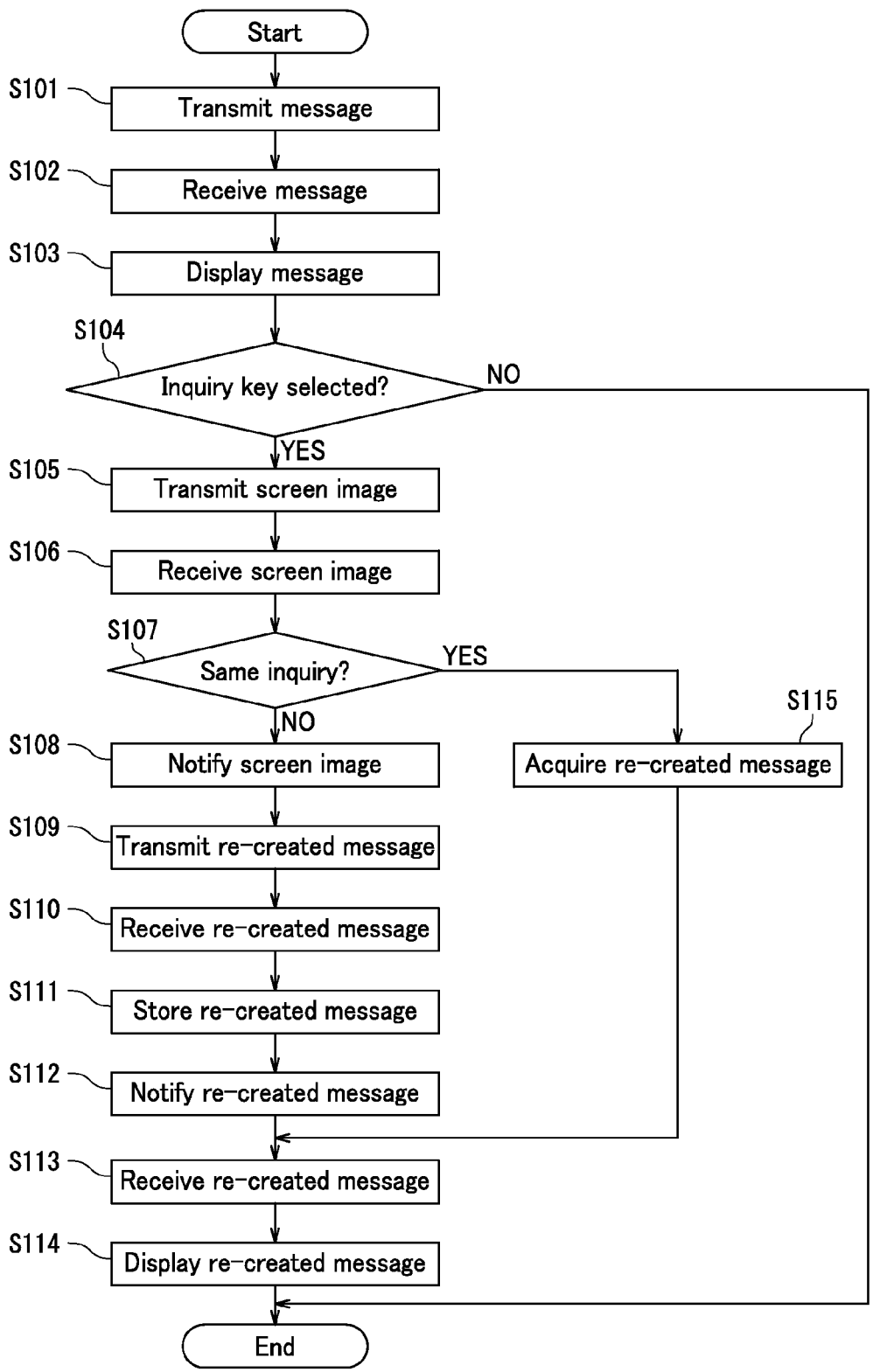
FIG. 3 is a flowchart showing processing steps according to the embodiment of the present disclosure.
Figure 4A:
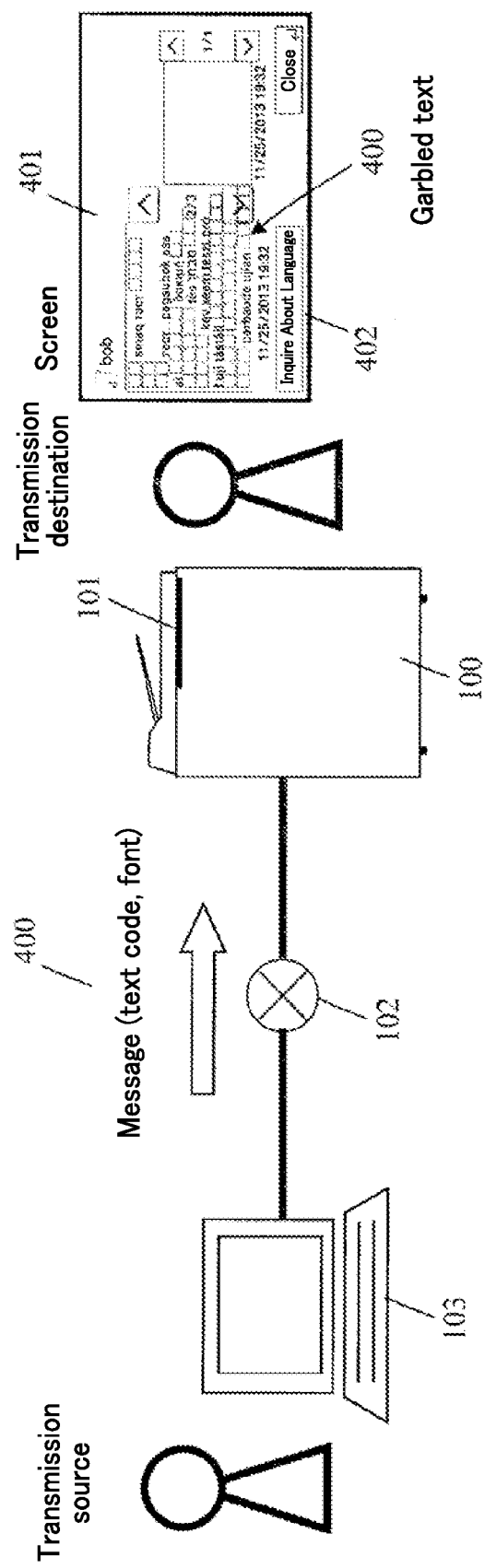
FIG. 4A shows an example of transmission of a message from a terminal device to a multifunction peripheral according to the embodiment of the present disclosure.

When displaying the screen image 401 including the message 400, the screen display section 203 displays the inquiry key 402 in a selectable state in the screen image 401 (S104 in FIG. 3). The user being the receiver of the message 400 can select the inquiry key 402 to inquire about the language in which the message 400 is created. In S104, the message 400 is displayed without being garbled when any font registered in the operation section 101 matches the font specified in the message 400. Therefore, the user being the receiver can view the message 400 and ends the processing, without selecting the inquiry key 402 (S104: NO in FIG. 3).

On the other hand, when none of the fonts registered in the operation section 101 matches the font specified in the message 400 (when, for example, a predetermined font is not registered in the operation section 101), the message 400 is garbled as shown in FIG. 4A. In this case, the user being the receiver makes an input of selecting the inquiry key 402 (S104: YES in FIG. 3). In response, a key receiving section 204 of the multifunction peripheral 100 receives the input of selecting the inquiry key 402. The key receiving section 204 notifies a screen transmitting section 205 of the multifunction peripheral 100 that the input of selecting the inquiry key 402 is received. In response to the notification, the screen transmitting section 205 transmits to the server 104 the screen image 401 in which the message 400 is displayed on the operation section 101, along with information specifying the terminal device 103 as the transmission source of the message 400 (FIG. 3: S105).

Figure 4B:
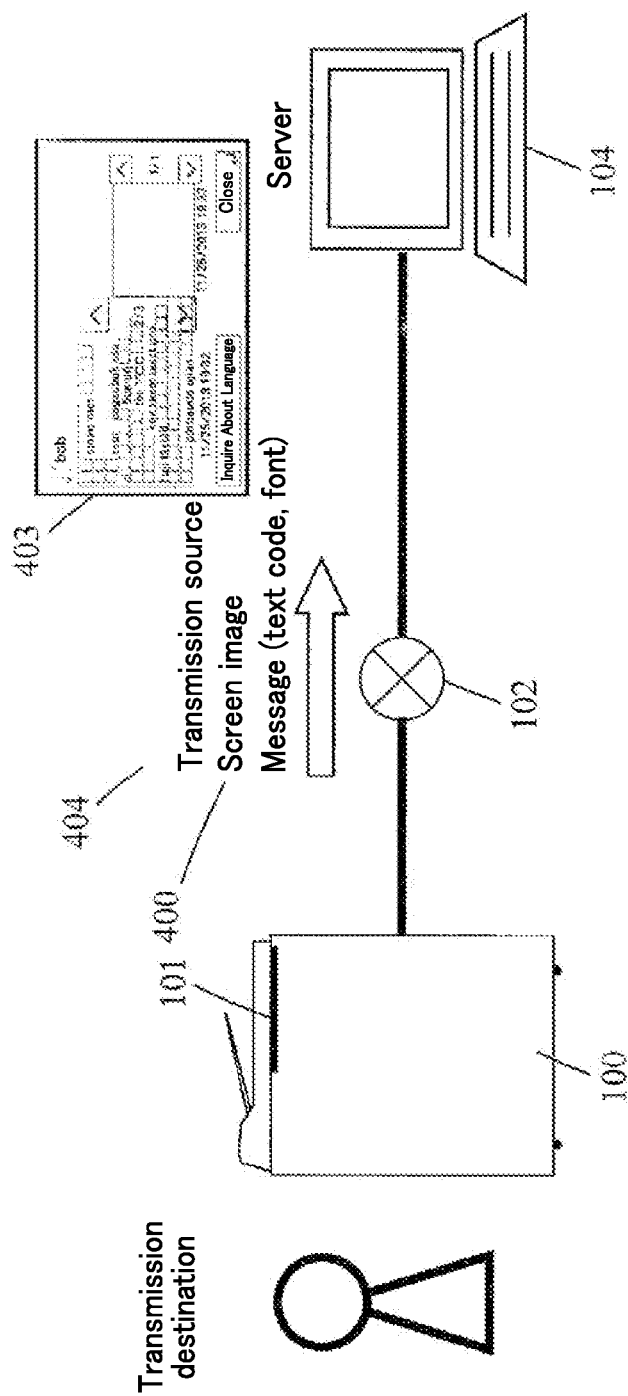
FIG. 4B shows an example of transmission of a screen image from a multifunction peripheral to a server according to the embodiment of the present disclosure.

Note that the scheme employed by the screen transmitting section 205 to transmit the screen image 401 and the information specifying the transmission source of the message 400 to the server 104 is not specifically limited. In one example, at the time when the inquiry key 402 is selected, the screen transmitting section 205 may acquire the screen image 401 displayed on the operation section 101 as a screen image 403 and also acquire transmission source information 404 specifying the terminal device 103 as the transmission source of the message 400 received by the screen display section 203. The transmission source information 404 is information uniquely specifying the terminal device 103 being the transmission source, and examples thereof include a MAC address and an email address. The screen transmitting section 205 attaches the transmission source information 404 to the screen image 403 and transmits the screen image 403 to the server 104 via the network 102 as shown in FIG. 4B.

Then, a control section 206 of the server 104 receives the screen image 403 (S106 in FIG. 3) and notifies an inquiry determination section 207 of the server 104 that the screen image 403 is received. In response to the notification, the inquiry determination section 207 determines whether or not an identical inquiry relevant to the screen image 403 has been previously received (S107 in FIG. 3).

The scheme employed by the determination section 207 to make the determination is not specifically limited. For example, the inquiry determination section 207 determines whether or not the transmission source information 404 of the message 400 included in the screen image 403 is already stored in a predetermined memory of the server 104.

Figure 5A:
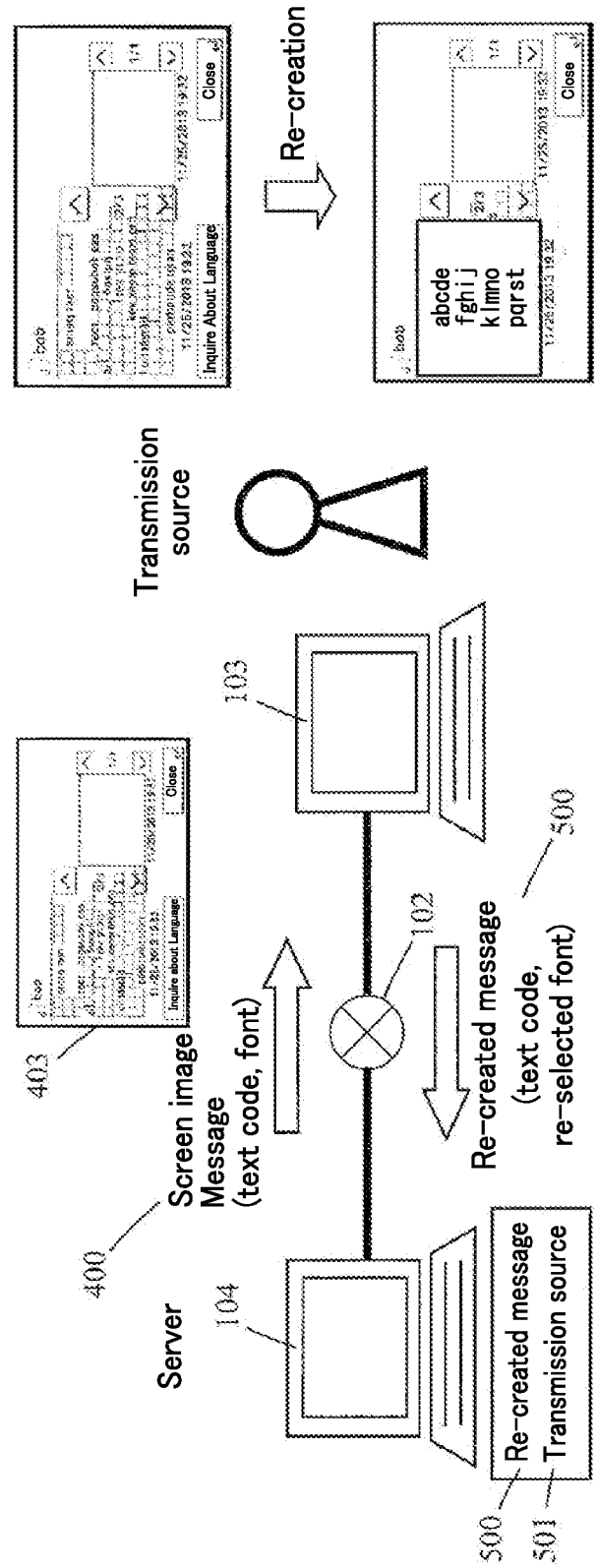
FIG. 5A shows an example of transmission of data between a server and a terminal device according to the embodiment of the present disclosure.

On determining that the transmission source information 404 is not stored (S107: NO in FIG. 3), the inquiry determination section 207 determines that an identical inquiry has not been previously received and thus notifies a screen notification section 208 of the server 104 that the transmission source information 404 is not stored. In response to the notification, the screen notification section 208 notifies (transmits) the screen image 403 to the terminal device 103 specified as the transmission source based on the transmission source information 404 attached to the screen image 403, via the network 102 as shown in FIG. 5A (S108: FIG. 3). The processing steps preformed when the inquiry determination section 207 determines that the transmission source information 404 is already stored (S107: YES in FIG. 3) will be described later.

The scheme employed by the screen notification section 208 to notify the screen image 403 to the terminal device 103 is not specifically limited. In one example, upon transmitting the screen image 403 to the terminal device 103 being the transmission source, the screen notification section 208 causes the screen image 403 to be displayed on a display section (liquid crystal display, for example) of the terminal device 103. Additionally, the screen notification section 208 causes the text code and the specification of the font included in the message 400 to be displayed beside the screen image 403. This informs the administrator (the user being the sender of the message 400) about the text code and the font resulting in garbled display of the message 400. Being allowed to directly view the screen image 403 displayed garbled, the administrator can more appropriately select a text code and a font less likely to cause garbling.

Upon the terminal device 103 receiving the screen image 403 from the screen notification section 208, the user being the sender of the message 400 operates the terminal device 103 to re-select an appropriate text code and font while viewing the screen image 403 and re-create a message to be delivered to the user being the receiver of the message 400. When the user being the sender of the message 400 realizes, through operating the terminal device 103, the absence of a text code and font correctly displayable on the operation section 101 of the multifunction peripheral 100, the user selects an ASCII code to re-create the message. Note that ASCII codes are correctly displayable on the operation section 101 of any model. Text in an ASCII code is a sequence of one-byte characters including alphanumeric characters and symbols and displayable on the operation section 101 of any model.

Once completing creation of a re-created message 500, the user being the sender of the message 400 inputs a predetermined transmission instruction to the terminal device 103. As shown in FIG. 5A, on receiving the transmission instruction input to the terminal device 103, the control section 201 of the terminal device 103 transmits the re-created message 500 to the server 104 (S109 in FIG. 3).

The control section 206 of the server 104 receives the re-created message 500 (which includes a text code and specification of re-selected font) from the terminal device 103 (S110 in FIG. 3) and then notifies a re-notification section 209 of the server 104 that the re-created message 500 is received from the terminal device 103. Upon receipt of the notification, the re-notification section 209 stores the re-created message 500 and the transmission source information 501 specifying the terminal device 103 as the transmission source of the re-created message 500 to the predetermined memory of the server 104 (S111 in FIG. 3). This is to enable the re-created message 500 to be used again when a user receiving a given message identical to the message 400 makes an inquiry about the language used to create the given message (the details thereof will be described later).

Figure 5B:
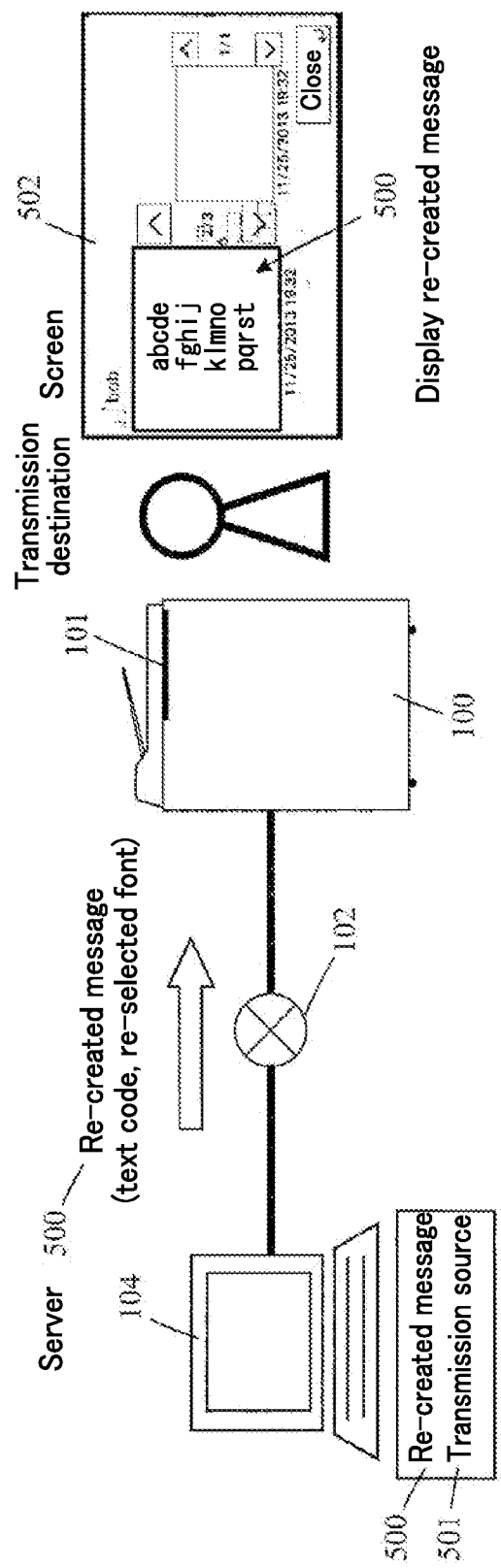
FIG. 5B shows an example of transmission of a re-created message from a server to a multifunction peripheral according to the embodiment of the present disclosure.

Next, as shown in FIG. 5B, the re-notification section 209 notifies (transmits) via the network 102 the re-created message 500 received from the terminal device 103 to the multifunction peripheral 100 on which the inquiry key 402 is selected (S112 in FIG. 3).

Then, the control section 202 of the multifunction peripheral 100 receives the re-created message 500 (including the text code and the specification of the re-selected font) from the server 104 (S113 in FIG. 3). The screen display section 203 displays on the operation section 101 a predetermined screen image 502 including the re-created message 500 displayed using a font registered in the operation section 101 (S114 in FIG. 3).

When displaying the re-created message 500 in the screen image 502, the screen display section 203 may inform that the re-created message 500 is received in response to the selection of the inquiry key 402. Note that when the re-created message 500 is displayed in the screen image 502, the font specified in the re-created message 500 is the one having been re-selected by the user being the sender of the re-created message 500. Therefore, the re-created message 500 is displayed in the screen image 502 without being garbled. In other words, as shown in FIG. 5B, the re-created message 500 on the screen image 502 appears as intended by the user being the sender of the re-created message 500. Consequently, when a message is transmitted from the terminal device 103 directly to the multifunction peripheral 100 and is composed of a text code and specification of a font not registered in the multifunction peripheral 100, the message can be still be displayed without garbled text. According to the present disclosure, instead of simply resolving garbling of the message 400 displayed by the multifunction peripheral 100, the sender of the message 400 is allowed to view the screen image 403 in which the message 400 is garbled and then adjust the settings in order to that the message 400 is correctly displayed on the multifunction peripheral 100 as intended by the sender. Note that applying automatic machine translation to a message that may be displayed garbled would result in a failure in successfully conveying the contents that the user being the sender of the message intends to convey. Therefore, instead of applying automatic translation, the present disclosure allows the user being the sender of the message 400 to re-create a message 500 that is correctly displayable on the multifunction peripheral 100 without garbled text. This improves the reliability that information carried by a message is correctly conveyed.

Referring back to S107, the following describes the processing performed in the case where an identical inquiry relevant to the screen image has been previously received (S107: YES in FIG. 3). The inquiry determination section 207 determines whether or not the predetermined memory of the server 104 already stores the transmission source information 404 specifying terminal device 103 as the transmission source of the message 400 included in the screen image 403. As has been described above, the predetermined memory of the server 104 at this stage already stores the re-created message 500 and the transmission source information 501 specifying the terminal device 103 as the transmission source of the re-created message 500. Consequently, the inquiry determination section 207 determines that an identical inquiry relevant to the screen image 403 has been previously received (S107: YES in FIG. 3) and notifies the re-notification section 209 about the determination result. In response to the notification, the re-notification section 209 fetches the re-created message 500 associated with the transmission source information 501 of the re-created message 500 (S115 in FIG. 3). Then, the re-notification section 209 notifies (transmits), via the network 102, the re-created message 500 to the multifunction peripheral 100 on which the selection of the inquiry key 402 is received (S111 in FIG. 3). The subsequent processing steps are the same as described above.

Where the terminal device 103 transmits the same message 400 to a plurality of multifunction peripheral 100 simultaneously, identical inquiries relevant to the screen image 403 may be received from the users of more than one multifunction peripheral 100. In such a case, a re-created message 500 is transmitted to the server 104 only once and can be used each time such an inquiry is received. This saves the trouble of re-creating a message 500 each time such an inquiry is received from a multifunction peripheral 100 and thus reduces the processing load of the terminal device 103, ensuring the re-created message 500 to be promptly notified to each multifunction peripheral 100. In addition, since the re-created message 500 is notified from the server 104 rather than from the terminal device 103, inquiries from the multifunction peripherals 100 can be handled even when the terminal device 103 is off (not activated).

The embodiment according to the present disclosure is configured such that one set of the re-created message 500 and the corresponding transmission source information 501 is stored in the predetermined memory of the server 104. However, other configurations may be applicable. For example, a plurality of different fonts may be specified for a re-created message 500. That is, a plurality of re-created messages 500 associated with the same piece of transmission source information 501 may be stored in the predetermined memory of the server 104. This supports display of the re-created message 500 in a plurality of languages supported by each multifunction peripheral 100.

According to the embodiment of the present disclosure, the multifunction peripheral 100, the terminal device 103, and the server 104 of the image processing system include the respective sections described above. Alternatively, however, these sections may be implemented through execution of programs stored on a storage medium and such a storage medium is provided to the multifunction peripheral 100, the terminal device 103, and the server 104 of the image processing system. In this configuration, the image processing device, the terminal device, and the server read and execute programs stored on the storage medium to implement relevant sections. In short, the programs per se read from the recording medium provide the effects of the present disclosure. The present disclosure may be implemented as a method stored on a hard disk and including the steps performed by the sections of the image processing device, the terminal device, and the server.

As has been described above, the image processing system and the image processing method according to the present disclosure find use in an image processing system that includes an image processing device, such as a multifunction peripheral, a copier, or the like, and effective in correcting garbled text.

What is claimed is:

1. An image processing system comprising a terminal device, a server, and an image processing device,
   the image processing device including:
      a screen display section that, upon the image processing device receiving a message from the terminal device, displays the message and a predetermined inquiry key in a predetermined screen image on the image processing device, the message being displayed using a font registered in advance in the image processing device; and
      a screen image transmitting section that, upon the image processing device receiving input of selecting the inquiry key, transmits to the server the predetermined screen image in which the message is displayed and information specifying the terminal device as a transmission source of the message,
   the server including:
      a screen image notifying section that, upon the server receiving the predetermined screen image, notifies the predetermined screen image to the terminal device based on the information specifying the terminal device as the transmission source of the message; and
      a re-notification section that, upon the server receiving a re-created message from the terminal device, notifies the re-created message to the image processing device.

2. The image processing system according to claim 1, wherein
   the server further includes an inquiry determination section that, upon the server receiving the predetermined screen image as an inquiry, determines whether or not an identical inquiry relevant to the predetermined screen image has been previously received, wherein
   when the determination indicates that no identical inquiry has been previously received, the re-notification section stores into a predetermined memory the re-created message and information specifying the terminal device as a transmission source of the re-created message, and
   when the determination indicates that an identical inquiry has been previously received, the re-notification section notifies the re-created message stored in the predetermined memory to the image processing device.

3. The image processing system according to claim 2, wherein
   the re-notification section stores a plurality of re-created messages associated with the transmission source information into the predetermined memory.

4. The image processing system according to claim 1, wherein
   the message provides information for a user of the image processing device being a destination of the message or information about automatic update of software installed in the image processing device.

5. The image processing system according to claim 1, wherein
   text constituting the message includes a text code and a specification of a font to be used for displaying the text represented by the text code.

6. The image processing system according to claim 1, wherein
   the screen display section substitutes a font specified in the message with the font registered in the image processing device and displays the message using the registered font in a pop-up window on a display screen of the image processing device.

* * * * *